United States Patent [19]
Laymon et al.

[11] Patent Number: 5,257,278
[45] Date of Patent: Oct. 26, 1993

[54] HELIUM-CADMIUM LASER FOR 353.6 NM LINE

[75] Inventors: Alexander J. Laymon, Santa Clara, Calif.; William T. Silfvast, Winter Springs, Fla.; Terrance L. Erisman, San Jose, Calif.

[73] Assignee: Liconix, Santa Clara, Calif.

[21] Appl. No.: 883,427

[22] Filed: May 13, 1992

[51] Int. Cl.$^5$ ............................................. H01S 3/08
[52] U.S. Cl. .................................... 372/99; 372/108; 372/20; 372/19; 372/56
[58] Field of Search ................ 372/18, 61, 20, 23, 372/56, 19; 378/101, 99

[56] References Cited

U.S. PATENT DOCUMENTS

| | | | |
|---|---|---|---|
| 3,772,609 | 11/1973 | Willett et al. | 372/23 |
| 4,287,484 | 9/1981 | Wang et al. | 372/23 |
| 4,575,850 | 3/1986 | Wang et al. | 372/23 |
| 4,615,033 | 9/1986 | Nakano et al. | 372/99 |
| 4,615,034 | 9/1986 | Von Gunten et al. | 372/99 |
| 4,710,938 | 12/1987 | Fuke et al. | 372/61 |
| 4,920,541 | 4/1990 | Baumgartner et al. | 372/23 |

OTHER PUBLICATIONS

Goldsborough, J. P.; Continuous Laser Oscillation at 3250 A in Cadmium Ion; IEEE Journal of Quantum Electronics, vol. QE-5, No. 2, Feb. 1969, p. 133.

*Primary Examiner*—Léon Scott, Jr.
*Attorney, Agent, or Firm*—Robert O. Guillot

[57] ABSTRACT

A helium-cadmium laser having high reflector mirror and output coupler mirror properties which favor lasing at 353.6 nm while inhibiting lasing at 325.0 nm. The preferred characteristics of the high reflector and/or output coupler mirrors include transmission at 325.0 nm greater than 10% and transmission at 353.6 nm less than 5%.

24 Claims, 3 Drawing Sheets

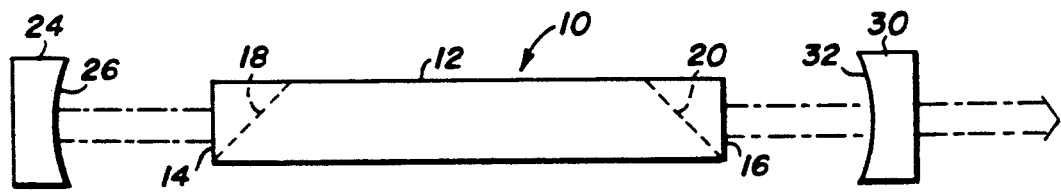
Fig_1
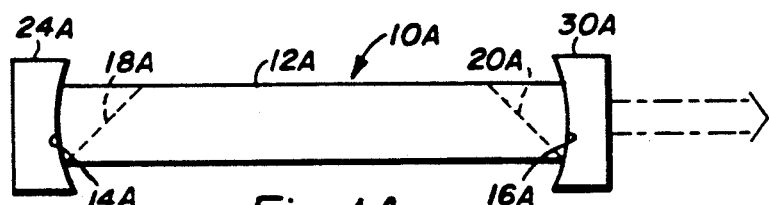
Fig_1A
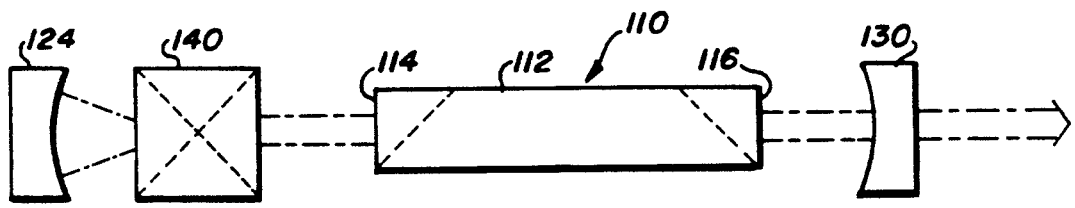
Fig_2
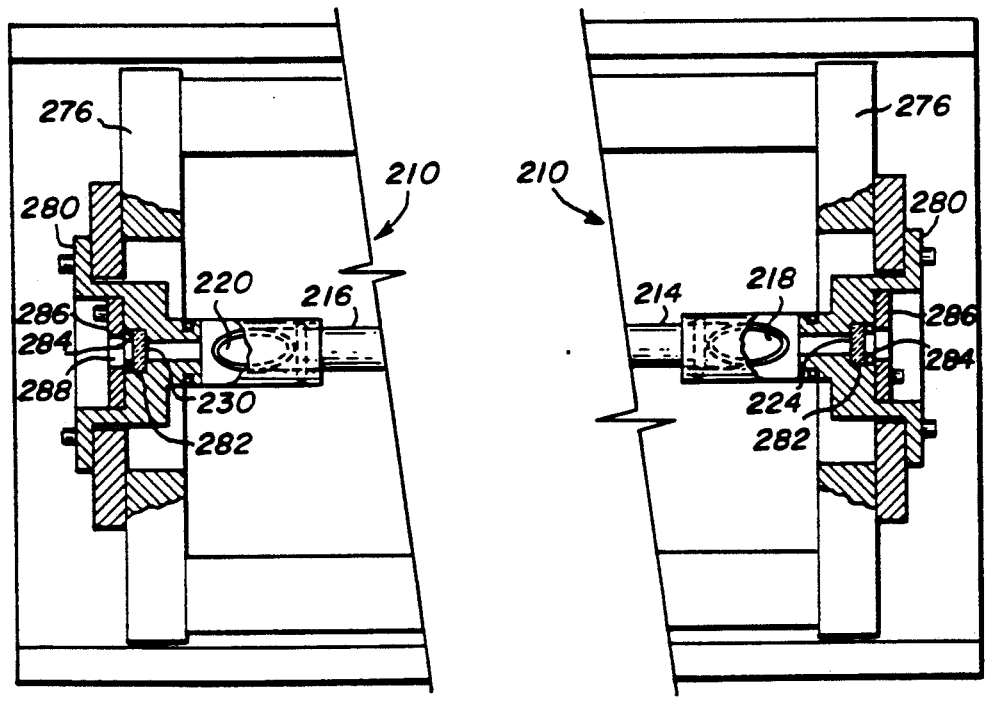
Fig_6          Fig_5

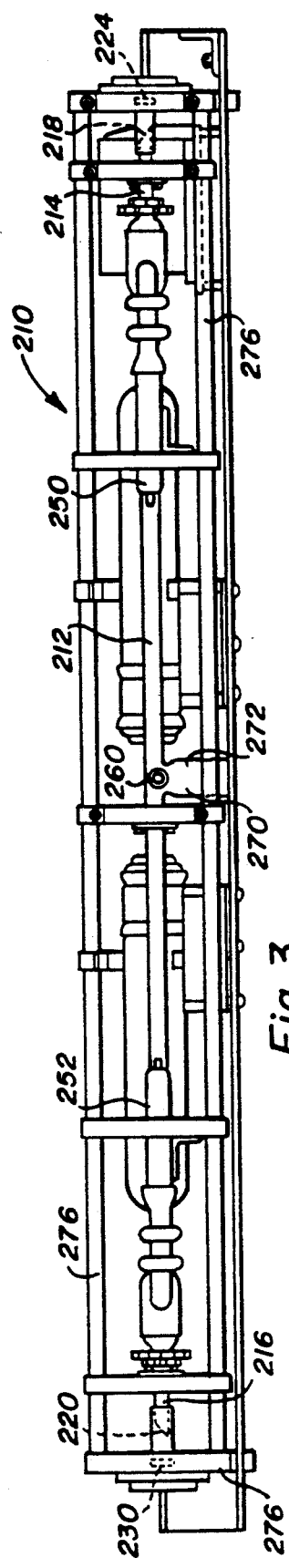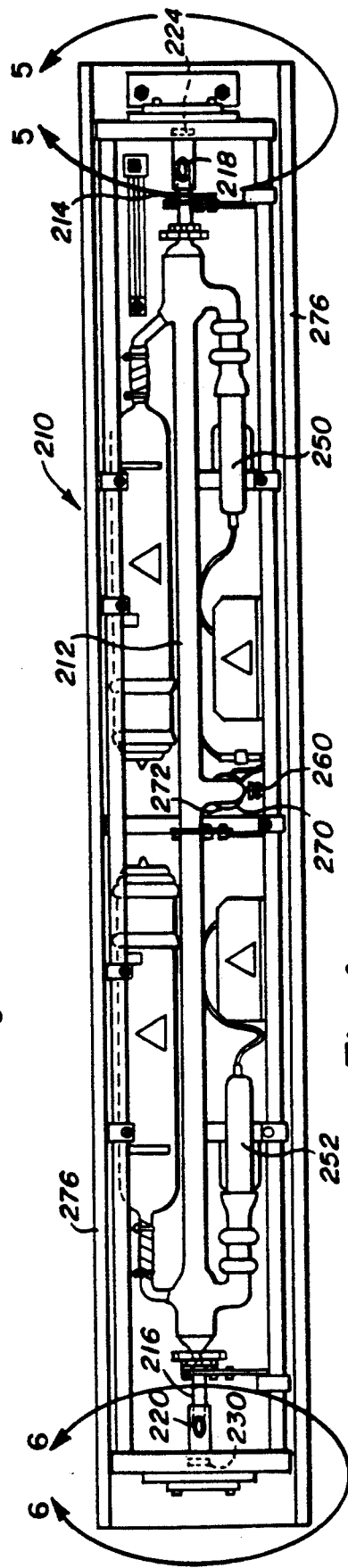
Fig. 3
Fig. 4

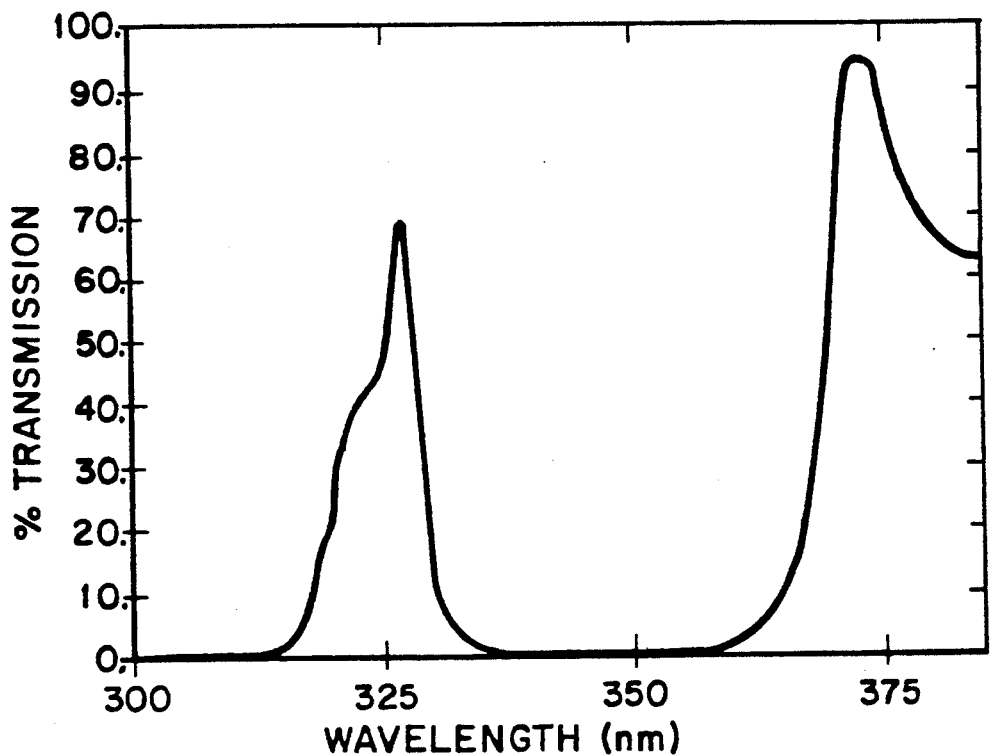
Fig_7
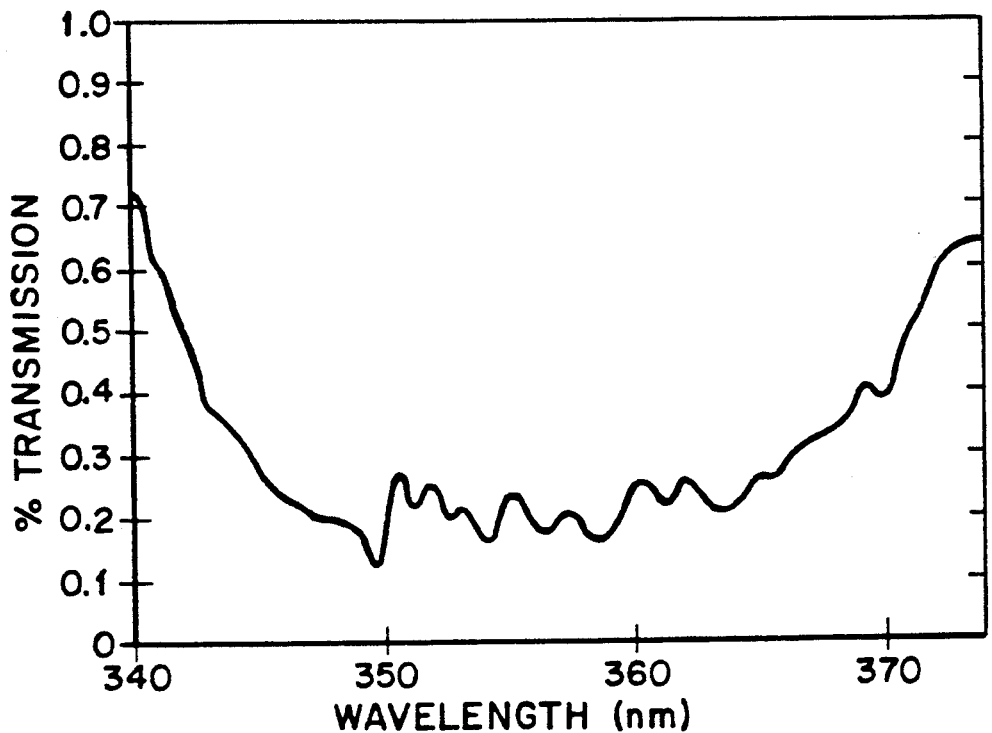
Fig_8

5,257,278

HELIUM-CADMIUM LASER FOR 353.6 NM LINE

BACKGROUND OF THE INVENTION

1. Field of the Invention

The present invention relates generally to helium-cadmium laser devices, and more particularly to a helium-cadmium laser that is designed to lase at 353.6 nm.

2. Description of the Prior Art

The characteristics of helium-cadmium (HeCd) laser devices are well known. Observable lasing transition lines have been identified at the wavelengths 325.0 nm and 441.6 nm in a positive column HeCd laser. Additional lasing transitional lines at the wavelengths 533.7 nm, 537.8 nm, 635.5 nm, 636.0 nm and others in the infrared have been observed in a hollow cathode discharge HeCd laser. There exists, however, a less well-known potential laser transition line at 353.6 nm, which was suggested by J. P. Goldsborough in the IEEE Journal of Quantum Electronics, Volume QE-5, Number 2, February, 1969, Page 133. This 353.6 nm line has never been observed to lase, apparently because the initial atomic energy level which characterizes the 325.0 nm line is the same initial level as that which characterizes the 353.6 nm line, and the 325.0 nm transition is strongly favored probabilistically for lasing over the transition producing the 353.6 nm line. Thus, although the theoretical possibility of the 353.6 nm line, as a lasing transition, was suggested in 1969, there has apparently been no laser device reported which successfully lases at the transition resulting in the 353.6 nm line.

SUMMARY OF THE INVENTION

It is an object of the present invention to create a helium-cadmium laser which lases at 353.6 nm.

It is another object of the present invention to provide a relatively small, relatively inexpensive laser which lases at 353.6 nm.

It is a further object of the present invention to provide a benchtop laser which lases at 353.6 nm.

Briefly, the present invention includes a helium-cadmium laser having a high reflector mirror and an output coupler mirror having optical characteristics which favor lasing at 353.6 nm while discouraging lasing at 325.0 nm. The preferred optical characteristics of the mirror(s) include transmission, scatter and absorption at 325.0 nm greater than 20% and transmission, scatter and absorption at 353.6 nm less than 5%.

It is an advantage of the present invention that it creates a helium-cadmium laser which lases at 353.6 nm.

It is another advantage of the present invention that it provides a relatively small, relatively inexpensive laser which lases at 353.6 nm.

It is a further advantage of the present invention that it provides a benchtop laser which lases at 353.6 nm.

These and other objects, features and advantages of the present invention will be apparent from the following detailed description of the preferred embodiments which makes reference to the several FIGURES of the drawing.

IN THE DRAWING

FIG. 1 is a schematic diagram of the present invention;

FIG. 1A is a schematic diagram of an alternative embodiment of the present invention;

FIG. 2 is a schematic diagram of another alternative embodiment of the present invention;

FIG. 3 is a side elevational view of a helium-cadmium laser of the present invention;

FIG. 4 is a top plan view of a helium-cadmium laser of the present invention;

FIG. 5 is a close-up view, having cut away portions of the high reflector end portion of the laser depicted in FIGS. 3 and 4, taken along lines 5—5 of FIG. 4;

FIG. 6 is a close-up view, having cut away portions of the output coupler end portion of the laser depicted in FIGS. 3 and 4, taken along lines 6—6 of FIG. 4;

FIG. 7 is a graph depicting mirror transmission versus wavelength of a suitable high reflector or output coupler mirror for the present invention; and FIG. 8 is a detailed graphic depiction of portions of the graph depicted in FIG. 7.

DESCRIPTION OF THE PREFERRED EMBODIMENT

FIG. 1 is a schematic diagram of a first preferred embodiment 10 of the helium-cadmium (HeCd) laser of the present invention. As depicted in FIG. 1, the HeCd laser 10 includes a centrally disposed HeCd tube assembly 12, preferably having sealed ends 14 and 16 which, in the preferred embodiment, are sealed with Brewster windows 18 and 20, respectively.

A high reflector mirror 24 is disposed at the inner end 14 of the tube 12 to reflect radiation at the appropriate wavelength range for lasing. A preferred high reflector mirror 24 possesses a concave reflecting surface and has reflective and transmissive radiation properties which discourage lasing at 325.0 nm and encourage lasing at 353.6 nm. It is to be understood that the definition of the words transmission and transmissive in regard to a mirror's optical properties shall be taken to include the non-reflective optical properties including radiation scattering, absorption, transmission (in the sense of radiation passage through the mirror) as well as other losses. Preferred ranges for these high reflector mirror transmission and reflection parameters are discussed hereinafter.

An output coupler mirror 30 is disposed proximate the output end 16 of the HeCd tube 12. The preferred output coupler mirror 30 is formed with a concave reflecting surface 32 and possesses reflective and transmissive radiation properties which inhibit lasing at 325.0 nm and promote lasing at 353.6 nm. The preferred range of parameters for the output coupler mirror 30 are discussed hereinafter.

It is to be understood that it is not necessary for both the high reflector mirror and output coupler mirror to possess properties that inhibit lasing at 325.0 nm and promote lasing at 353.6 nm. Rather, lasing of the invention at 353.6 nm can be achieved where only one of the high reflector mirror 24 or output coupler mirror 30 inhibits lasing at 325.0 nm and promotes lasing at 353.6 nm, while the other output coupler mirror 30 or high reflector mirror 24, respectively, permits lasing at both 325.0 nm and 353.6 nm.

With regard to the embodiment of the present invention 10 that is disclosed in FIG. 1, it is to be understood that the HeCd tube 12 comprises a well-known, prior art component. The novelty of the present invention resides in the utilization of high reflector and output coupler mirrors 24 and 30 respectively having a desired combination of reflective and transmissive properties which inhibit lasing at 325.0 nm and encourage lasing at 353.6 nm.

It is to be understood that successful lasing depends in general on a suitable choice of laser tube and mirror parameters such as tube length and bore diameter, gas pressure and cadmium vapor pressure, laser mirror reflectivity and losses, etc. These parameters will vary to a greater or lesser extent from one laser design to another. There is however a generally applicable expression that can be used to define whether a certain laser transition will or will not result in lasing in any particular laser tube design. We define the following useful parameters:

$G(\lambda)$ is the single pass gain of a laser at wavelength $\lambda$.

$Rhr(\lambda)$ is the reflectivity of the high reflector mirror at $\lambda$.

$Roc(\lambda)$ is the reflectivity of the output coupler mirror at wavelength $\lambda$.

For any mirror, the sum of the Reflectivity R, the Transmission T, the Scatter loss S, and the Absorption loss A equals unit, i.e.

$$R+T+S+A=1$$

Thus for a beam of intensity I incident upon a mirror, RI represents the intensity of the reflected beam where $$R=1-T-S-A$$

A necessary condition for lasing at wavelength $\lambda$ is $$[1+G(\lambda)]^2 \times Rhr(\lambda) \times Roc(\lambda) > 1.$$

which states that, for lasing to occur, the intensity of a beam of radiation, at wavelength $\lambda$, having completed two one-way passes (a round trip) through the gain medium and having experienced the losses related to reflection from a mirror at each end, including Brewster window absorption and scatter losses, if any, must have increased by greater than unity if lasing is to occur.

The general requirement for lasing at 353.6 nm is that $$[1+G(353.6)]^2 \times Roc(353.6) \times Rhr(353.6) > [1+G(325.0)]^2 \times Roc(325.0) \times Rhr(325.0)$$

which states that the round trip gain at 353.6 nm is greater than the round trip gain at 325.0 nm and consequently lasing at 353.6 nm is preferred over lasing at 325.0 nm.

A more stringent requirement for lasing at 353.6 nm in the helium cadmium laser can be stated as follows:

$$[1+G(353.6)]^2 \times Roc(353.6) \times Rhr(353.6) > 1 \quad (1)$$

and simultaneously $$[1+G(325.0)]^2 \times Roc(325.0) \times Rhr(325.0) < 1 \quad (2)$$

Equation (2) states that the gain at 325.0 nm is insufficient to overcome losses at 325.0 nm and hence lasing cannot occur at 325.0 nm.

FIG. 1A is a schematic diagram depicting an alternative embodiment 10A of the present invention, that is closely related to embodiment 10 depicted in FIG. 1. Embodiment 10A is an integral mirror laser tube, wherein the high reflector mirror 24A and the output coupler mirror 30A are sealed to the tube body 12A at the tube ends 14A and 16A, respectively. The Brewster window(s) 18A and 20A are optional in this design, however, the optical specifications for the mirrors 24A and 30A, as well as the tube 12A, are the same as those for embodiment 10 depicted in FIG. 1. Specifically, the high reflector mirror 24A and output coupler mirror 30A, together with the tube 12A, possess the desired combination of reflective and transmissive properties which inhibit lasing at 325.0 nm and encourage lasing at 353.6 nm.

Another alternative embodiment of the present invention is depicted as a schematic diagram in FIG. 2. The alternative embodiment 110 includes a HeCd tube 112 which is basically identical to the prior art HeCd tube 12 depicted in FIG. 1. The embodiment 110 includes a high reflector mirror 124 and an output coupler mirror 130 which differ from the mirrors 24 and 30 respectively of FIG. 1 in that their reflective and transmissive properties are generally substantially identical for radiation in the 325 nm–354 nm range. It is therefore to be understood, in light of the discussion hereinabove, that if mirrors 124 and 130 were substituted for mirrors 24 and 30 respectively in the device 10 depicted in FIG. 1, that the device 10 would lase at 325.0 nm only.

A tuning element 140 is disposed in the light path of the alternative embodiment 110 to inhibit lasing at 325.0 nm and promote lasing at 353.6 nm. In the preferred embodiment 110, the tuning element 140 is disposed between the high reflector end 114 of the HeCd tube 112 and the high reflector mirror 124. Such a tuning element 124 would include devices 140 such as a low loss Brewster prism, a Littrow prism, a diffraction grating or a birefringent filter. These devices 140 would be installed in such a manner as to tune the device to suppress lasing at 325 nm and achieve lasing at 353.6 nm. These devices could also be used to suppress lasing at 353.6 nm and permit lasing at 325.0 nm, if so desired.

It is therefore to be understood that the alternative embodiment 110 comprises a prior art HeCd tube 12 together with external devices including the tuning element 140 and the high reflector and output coupler mirrors 124 and 130 which together possess appropriate characteristics that inhibit lasing at 325.0 nm and encourage lasing at 353.6 nm.

FIGS. 3, 4, 5 and 6 depict a HeCd laser 210 of the present invention, wherein FIG. 3 is a side elevational view, FIG. 4 is a top plan view, FIG. 5 is a cut-away view of the high reflector end 214 of the laser 210 taken along lines 5—5 of FIG. 4, and FIG. 6 is a cut away view of the output coupler end 216 of the laser 210 taken along lines 6—6 of FIG. 4. As depicted in FIGS. 3, 4, 5 and 6, a HeCd laser 210 of the present invention includes a glass lasing tube 212 having a high reflector end 214 and an output coupler end 216. A Brewster window 218 is engaged to the high reflector end 214, and a second Brewster window 220 is engaged to the output coupler end 216. A high reflector mirror 224 (best seen in FIG. 5) is disposed proximate the high reflector end 214, and an output coupler mirror 230 (best seen in FIG. 6), is disposed proximate the output coupler end 216.

The lasing tube 212 has two cathodes 250 and 252 and a centrally disposed anode 260 which is shared by the two cathodes. The cadmium source 270 is located in the center of the tube 212 with a heater assembly 272 around it. A support structure 276, typically formed from invar or graphite rods, rigidly holds the tube 212 together with the mirrors 224 and 230 in accurate alignment with the center of the tube. It is to be understood that a HeCd laser of the type and description of the HeCd laser 210 described above is acknowledged to comprise a prior art structure. A particular laser of this general description has been marketed by Liconix of Santa Clara, Calif., the assignee of this patent application, as Embosser Series Model Number 4270N (Embosser Series is a trademark of Liconix). It has a specified power output of 70 mW (85 mW typical), TEMoo mode at 442 nm, and 10 mW (15 mW typical) TEMoo mode at 325 nm. The laser is polarized due to the fact that it is a Brewster window tube. The significant difference between the present invention and the prior art, such as model 4270N is the particular mirrors, and their properties, which are utilized in the present invention to inhibit lasing at 325.0 nm and promote lasing at 353.6 nm.

FIG. 5 depicts the high reflector end 214 of the HeCd laser 210 having cut-away portions to reveal the high reflector mirror 224, and FIG. 6 depicts the output coupler end 216 of the HeCd laser 210 having cut-away portions to reveal the output coupler mirror 230. It is to be understood that FIGS. 5 and 6 depict substantially identical resonator structures for holding the mirrors 224 and 230 while permitting tuning of the device 210. As depicted in FIGS. 5 and 6, the laser 210 has a support structure 276 that includes a mirror holder 280 having a centrally disposed mirror holding aperture 282 formed therein. The mirror 224 and 230 is held within the aperture by an o-ring 284 and a mirror plate 286. An output aperture 288 is formed through the plate 286 at the output coupler end 216 to permit the output of the laser through the output coupler mirror 230. It is to be understood that the mirror holding and output structures described above with reference to FIGS. 5 and 6 are found in prior art devices, such as the model 4270N HeCd laser identified above.

As has been stated above, the significant characteristic of the mirror and tuning systems of the present invention (specifically mirrors 24 and 30 of embodiment 10; mirrors 24A and 30A of embodiment 10A; mirrors 224 and 230 of embodiment 210; and mirrors 124 and 130 together with tuning element 140 of embodiment 110) is that the lasing of the HeCd tube at 325.0 nm is inhibited while lasing at 353.6 nm is promoted. With regard to embodiments 10 and 210 the mirror requirements are that the combined mirror transmission at 325.0 nm be sufficiently high that lasing at 325.0 nm does not occur. It is to be understood that the properties of either one or both of the mirrors can be such as to inhibit lasing at 325.0 nm. This will occur where a mirror's transmission at 325.0 nm is within the range from as low as 5% to as high as 100%, where higher transmissivity yields better results, while at the same time a mirror's transmission at 353.6 nm ranges from 0% to 5%, with better results being obtained at lower transmission values. As stated above, it is to be understood that the definition of the words transmission and transmissive in regard to a mirror's optical properties shall be taken to include the non-reflective optical properties including radiation scattering, absorption, transmission (in the sense of radiation passage through the mirror) as well as other losses. In the preferred embodiment, where both mirrors possess 325.0 nm lasing inhibiting properties, the preferable ranges for the reflector mirror are mirror transmission at 325.0 nm greater than 10% and mirror transmission at 353.6 nm at less than 2%, and the output coupler mirror having mirror transmission at 325.0 nm greater than 10% and mirror transmission at 353.6 nm less than 2%. With regard to the embodiment 110, it is not necessary for the mirrors 124 and 130 to have transmission properties that distinguish between 325.0 nm and 353.6 nm because the tuning element provides such properties. The range of properties for the tuning element in embodiment 110 are such that it can be manipulated to allow only the 325.0 nm or the 353.6 nm transition to lase. With regard to suitable output coupler and/or high reflector mirror properties, FIGS. 7 and 8 present graphs of mirror transmission properties versus wavelength. As can be seen from FIGS. 7 and 8, a suitable mirror transmits approximately 50% of the incident radiation at 325.0 nm and approximately 0.2% of the radiation at 353.6 nm.

With particular regard to the HeCd laser 210 depicted in FIGS. 3, 4, 5 and 6, specifically depicting the model 4270N of Liconix, the particular operating parameters and mirror parameters are as follows:

| | |
|---|---|
| Active Bore Length | = 70 cm |
| Bore Diameter | = 16 mm |
| Total Tube Voltage | = 3500 VDC |
| Tube Current | = 65 mA |
| Helium Pressure | = 6.0 Torr |
| Cadmium Vapor Pressure | = $7.6 \times 10^{-3}$ Torr |
| Mirror Separation | = 92.3 cm |
| Output Coupler Mirror: Material - Fused Silica | |
| Curvature (concave) | = 120 cm |
| Mirror Transmission at 325 nm | > 20% |
| Mirror Transmission at 354 nm | = .6% |
| Mirror Reflection at 354 nm | = 99.4% |
| High Reflector Mirror: Material - Fused Silica | |
| Curvature (concave) | = 120 cm |
| Mirror Transmission at 325 nm | = 20% |
| Mirror Transmission at 354 nm | = .05% |
| Mirror Reflection at 354 nm | = 99.95% |

A Liconix 4270N HeCd laser operating with the above specifications would produce a laser with approximately 20 mW multimode power at 353.6 nm.

Mirrors having the essential characteristics described above may be ordered for manufacturing from various commercial sources. The high reflector mirror 224 and output coupler mirror 230 of the present invention for the model 4270N Liconix HeCd laser may be obtained from many vendors, such as PMS Electroptics, Inc., 1855 South 57th Court, Boulder, Colo. 80301 and Coherent Optics, Inc., 2301 Lindberg Street, Auburn, Calif. 95603.

While the invention has been particularly shown and described with reference to certain preferred embodiments, it will be understood by those skilled in the art that various alterations and modifications in form and detail may be made therein. Accordingly, it is intended that the following claims cover all such alterations and modifications as may fall within the true spirit and scope of the invention.

What I claim is:

1. A HeCd laser for lasing at 353.6 nm, having a HeCd laser tube including means to cause cadmium atoms to be ionized within said HeCd laser tube and the cadmium ions to emit electromagnetic radiation, comprising:

a laser oscillation control means including a first radiation reflecting means and a second radiation reflecting means, said first radiation reflecting means and said second radiation reflecting means being disposed proximate a first end and a second end of said HeCd laser tube respectively and functioning in combination to inhibit the laser oscillation of said HeCd laser tube at 325.0 nm and to promote the laser oscillation of said HeCd laser tube at 353.6 nm.

2. A HeCd laser as described in claim 1 wherein said first radiation reflecting means includes a high reflector mirror being disposed proximate a high reflector end of said laser tube and said second radiation reflecting means includes an output coupler mirror being disposed proximate an output coupler end of said laser tube;

and wherein the output coupler mirror transmission at 325.0 nm is greater than 10%, and wherein the output coupler mirror transmission at 353.6 nm is less than 5%.

3. A HeCd laser as described in claim 1 wherein said first radiation reflecting means includes a high reflector mirror being disposed proximate a high reflector end of said laser tube and said second radiation reflecting means includes an output coupler mirror being disposed proximate an output coupler end of said laser tube;

and wherein the high reflector mirror transmission at 325.0 nm is greater than 10%, and wherein the high reflector mirror transmission at 353.6 nm is less than 5%.

4. A HeCd laser as described in claim 2 or 3 wherein said output coupler mirror transmission at 325.0 nm is greater than 20% and said high reflector mirror transmission at 325.0 nm is greater than 20%.

5. A HeCd laser as described in claim 2 or 3 wherein said output coupler mirror transmission at 353.6 nm is less than 2% and wherein said high reflector mirror transmission at 353.6 nm is less than 2%.

6. A HeCd laser as described in claim 2 or 3 wherein said output coupler mirror transmission at 353.6 nm is less than 0.7% and said high reflector mirror transmission at 353.6 nm is less than 0.6%.

7. A HeCd laser as described in claim 1 wherein said laser oscillation control means includes a laser tuning element, said laser tuning element being disposed in a laser radiation path of said laser tube, said laser tuning element functioning in combination with at least one of said first radiation reflecting means and second radiation reflecting means to inhibit the laser oscillation of said HeCd laser tube at 325.0 nm and to promote the laser oscillation of said HeCd laser tube at 353.6 nm.

8. A HeCd laser as described in claim 7 wherein said tuning element comprises a Brewster prism.

9. A HeCd laser as described in claim 7 wherein said tuning element comprises a Littrow prism.

10. A HeCd laser as described in claim 7 wherein said tuning element comprises a diffraction grating.

11. A HeCd laser as described in claim 7 wherein said tuning element comprises a birefringent filter.

12. A HeCd laser for lasing at 353.6 nm, including a HeCd laser tube having a source of helium and a source of cadmium engaged thereto, said laser tube having a high reflector end and an output coupler end, and a laser power supply, said power supply functioning to provide power to said HeCd laser tube to cause said cadmium atoms to be ionized within said laser tube and to emit electromagnetic radiation, comprising:

laser inhibition and tuning means, said laser inhibition and tuning means including a high reflector mirror portion being disposed proximate said high reflector end of said laser tube, and an output coupler mirror portion being disposed proximate said output coupler end of said laser tube; said high reflector mirror portion and said output coupler mirror portion functioning in combination to inhibit lasing of said laser tube at 325.0 nm and to promote the lasing of said laser tube at 353.6 nm.

13. A HeCd laser as described in claim 12 wherein the output coupler mirror transmission at 325.0 nm is greater than 10%, and wherein the output coupler mirror transmission at 353.6 nm is less than 5%.

14. A HeCd laser as described in claim 12 wherein the high reflector mirror transmission at 325.0 nm is greater than 10%, and wherein the high reflector mirror transmission at 353.6 nm is less than 5%.

15. A HeCd laser as described in claims 13 or 14 wherein said output coupler mirror transmission at 325.0 nm is greater than 20% and said high reflector mirror transmission at 325.0 nm is greater than 20%.

16. A HeCd laser as described in claims 13 or 14 wherein said output coupler mirror transmission at 353.6 nm is less than 2% and wherein said high reflector mirror transmission at 353.6 nm is less than 2%.

17. A HeCd laser as described in claims 13 or 14 wherein said output coupler mirror transmission at 353.6 nm is less than 0.7% and said high reflector mirror transmission at 353.6 nm is less than 0.06%.

18. A HeCd laser as described in claim 12 wherein said laser inhibition and tuning means includes a laser tuning element, said laser tuning element being disposed in a laser path of said laser tube and being adjustable to cause laser oscillation at either 353.6 nm or 325.0 nm, but not both simultaneously.

19. A HeCd laser as descried in claim 18 wherein said tuning element comprises a Brewster prism.

20. A HeCd laser as described in claim 18 wherein said tuning element comprises a Littrow prism.

21. A HeCd laser as described in claim 18 wherein said tuning element comprises a diffraction grating.

22. A HeCd laser as described in claim 18 wherein said tuning element comprises a birefringent filter.

23. A HeCd laser for lasing at 353.6 nm, having a HeCd laser tue including means to cause cadmium atoms within said HeCd laser tube to be ionized and to emit electromagnetic radiation, comprising:

a laser oscillation control means including a first radiation reflecting means and a second radiation reflecting means, said first radiation reflecting means and said second radiation reflecting means being disposed proximate a first end and a second end of said HeCd laser tube, respectively, and functioning to inhibit the laser oscillation of said HeCd laser tube at 325.0 nm and to promote the laser oscillation of said HeCd laser tube at 353.6 nm;

wherein said HeCd laser tube has a single pass gain $(G(\lambda))$ at wavelength $\lambda$;

wherein said laser oscillation control means includes a high reflector mirror having a reflectivity $(Rhr(\lambda))$ at wavelength $\lambda$;

wherein said laser oscillation control means further includes an output coupler mirror having a reflectivity $(Roc(\lambda))$ at wavelength $\lambda$;

and wherein the following conditions exist:

$$[1+G(353.6)]^2 \times Roc(353.6) \times Rhr(353.6) > [1+G(325.0)]^2 \times Roc(325.0) \times Rhr(325.0)$$

24. A HeCd laser for lasing at 353.6 nm, having a HeCd laser tube including means to cause cadmium atoms within said HeCd laser tube to be ionized and to emit electromagnetic radiation, comprising:

a laser oscillation control means including a first radiation reflecting means and a second radiation reflecting means, said first radiation reflecting means and said second radiation reflecting means being disposed proximate a first end and a second end of said HeCd laser tube, respectively, and functioning to inhibit the laser oscillation of said HeCd laser tube at 325.0 nm and to promote the laser oscillation of said HeCd laser tube at 353.6 nm;

wherein said HeCd laser tube has a single pass gain $(G(\lambda))$ at wavelength $\lambda$;

wherein said laser oscillation control means includes a high reflector mirror having a reflectively $(Rhr(\lambda))$ at wavelength $\lambda$;

wherein said laser oscillation control means further includes an output coupler mirror having a reflectivity $(Roc(\lambda))$ at wavelength $\lambda$;

and wherein the following conditions exist:

$$[1+G(353.6)]^2 \times Roc(353.6) \times Rhr(353.6) > 1$$

and simultaneously $$[1+G(325.0)]^2 \times Roc(325.0) \times Rhr(325.0) < 1.$$

* * * * *

UNITED STATES PATENT AND TRADEMARK OFFICE
CERTIFICATE OF CORRECTION

PATENT NO. : 5,257,278
DATED : October 26, 1993
INVENTOR(S) : Laymon et al.

It is certified that error appears in the above-identified patent and that said Letters Patent is hereby corrected as shown below:

Column 6, line 21; please delete "16" and substitute --1.6-- therefor.

Column 7, line 35; please delete "0.6%" and substitute --0.06%-- therefor.

Column 8, line 38; please delete "tue" and substitute --tube-- therefor.

Signed and Sealed this

Twenty-eighth Day of June, 1994

Attest:

BRUCE LEHMAN

Attesting Officer

Commissioner of Patents and Trademarks